United States Patent Office 3,511,349
Patented May 12, 1970

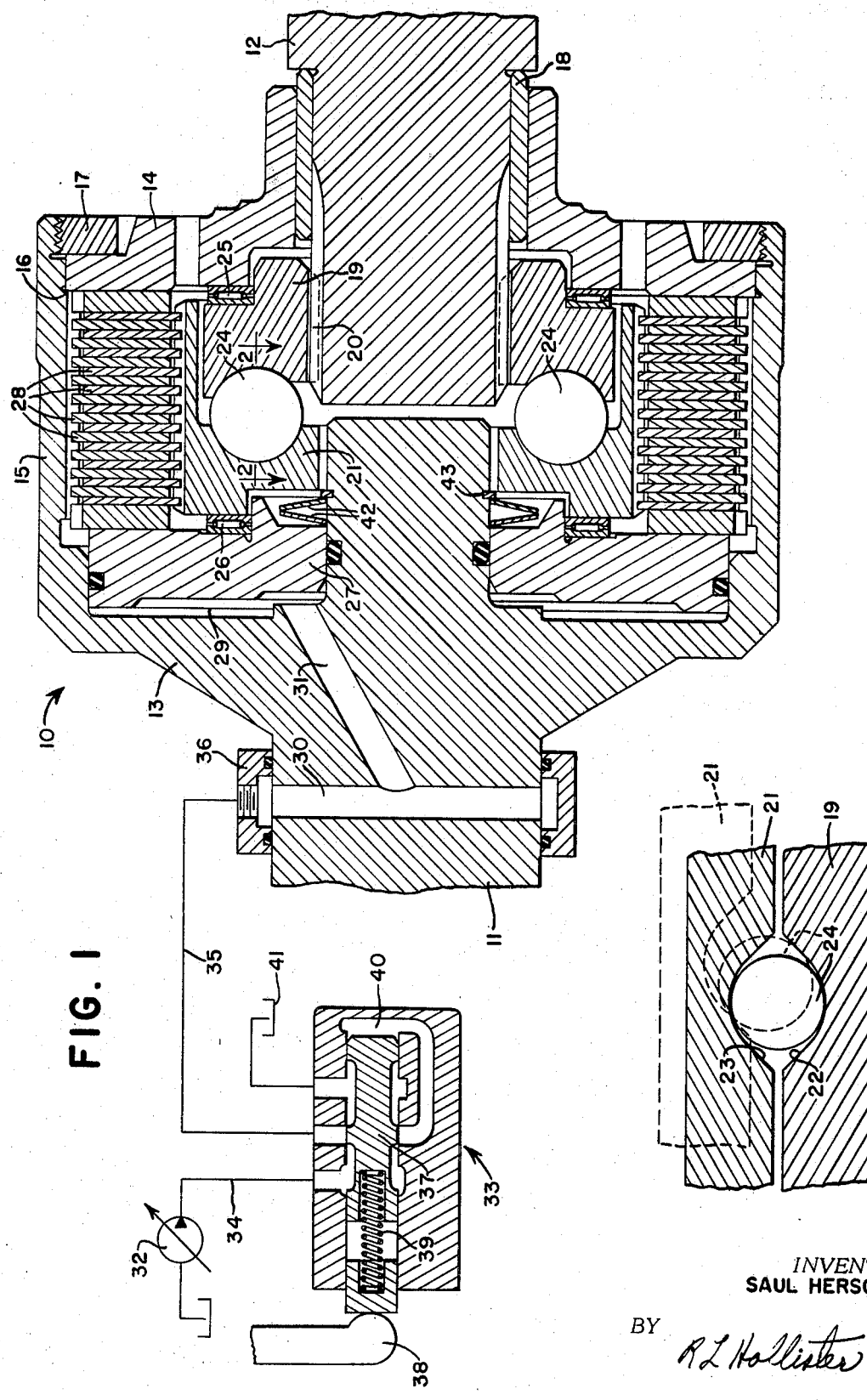

3,511,349
CLUTCH
Saul Herscovici, Waterloo, Iowa, assignor to Deere & Company, Moline, Ill., a corporation of Delaware
Filed Aug. 30, 1968, Ser. No. 756,551
Int. Cl. F16d 17/02
U.S. Cl. 192—56       11 Claims

ABSTRACT OF THE DISCLOSURE

A hydraulically actuated selectively engageable and disengageable multiple disk torque limiting clutch in which the clamp-up pressure provided on the disks is varied inversely proportional to the transmitted torque so that variations in the friction coefficient of the disks are counteracted by the clutch pressure to reduce torque fluctuations such as the fluctuation between breakaway torque and slip torque.

BACKGROUND OF THE INVENTION

The present invention relates generally to clutches, and more particularly to hydraulically actuated selectively engageable and disengageable multiple disk torque limiting clutches.

Torque limiting clutches and their use to protect various driving or driven elements on either side of the clutch are well known. However, the operating characteristics of most slip clutches known today are such that the breakaway torque is always higher than the slip torque, and both can vary by more than one-hundred-percent on the same unit due to changing coefficients of friction of the clutch surfaces during operation. Therefore, even though a slip clutch is designed with the expected minimum torque only slightly above rated torque to transmit full load without slippage, the maximum transmitted torque caused by variations in coefficient of friction could still impose excessively high torque loads on the elements driven by the clutch.

In order to overcome the disadvantages inherent in most slip clutches as noted above, various attempts have been made to design clutches in which the clamp-up pressure of the clutch plates would be varied inversely proportional to the transmitted torque so that the difference between the breakaway torque and the slip torque would be reduced to a more tolerable magnitude. Examples of such clutches are illustrated in U.S. Pats. 1,632,539 issued to R. Chilton on June 14, 1927 and 1,739,947 issued to R. Chilton on Dec. 17, 1929. While these last mentioned clutches represented improvements in the art of slip clutches, they still had their drawbacks. For example, once the rated torque of these clutches had been set, there was no convenient means of varying the rated torque without making physical adjustments on the clutch itself. Also, these clutches could not be engaged and disengaged at the will of an operator.

U.S. Pat. 3,360,087 issued to C. R. Hilpert on Dec. 26, 1967 illustrates the design of a torque limiting clutch which is selectively engageable and disengageable, in which the rated torque is easily adjusted, and in which the clutch plate clamp-up pressure varied inversely to the transmitted torque. However, in this clutch design, as the transmitted torque increased there would be a short time delay before the clutch clamp-up pressure would actually be reduced, and therefore high peak loads would be transferred through the clutch before the clamp-up pressure was reduced and the clutch began to slip. The time delay in this clutch design was due to the fact that an increase in transmitted torque merely served to close a supply valve to the pressure chamber of the clutch and the pressure in the chamber would then slowly be reduced as the fluid was exhausted through a restricted exhaust passage.

SUMMARY OF THE INVENTION

The principal object of the present invention is to provide a hydraulically actuated selectively engageable and disengageable multiple disk torque limiting clutch in which the fluctuations in transmitted torque are extremely small.

A further object of the present invention is to provide a hydraulically actuated torque limiting clutch in which the clutch clamp-up pressure is automatically varied in inverse proportion to the transmitted torque and in which there is no time delay between an increase in transmitted torque and a reduction in the clutch clamp-up pressure.

Yet another object of the present invention is to provide a multiple disk torque limiting clutch in which the clutch clamp-up pressure is varied in inverse proportion to the transmitted torque and in which the rated torque of the clutch is easily adjusted.

A still further object of the present invention is to provide a hydraulically actuated selectively engageable and disengageable torque limiting clutch in which the limits of the clutch are adjustable, and in which a single external source of fluid pressure can be used to engage the clutch and to define the limits of the clutch.

The above and other objects and advantages of the present invention will become apparent along with the details of construction of a preferred embodiment of the invention from a reading of the following detailed description when taken in conjunction with the accompanying drawing.

BRIEF DESCRIPTION OF THE DRAWING

In the drawing:
FIG. 1 is a cross sectional view of a torque limiting clutch embodying the principles of the present invention, with a fluid supply system therefor shown partly schematically; and
FIG. 2 is a sectional view taken substantially along the lines 2—2 of FIG. 1.

DESCRIPTION OF THE PREFERRED EMBODIMENT

Referring to the drawing, a clutch indicated generally at 10 has a torque input shaft 11 and a torque output shaft 12, the two shafts 11 and 12 being rotatable about a common axis. While the shafts 11 and 12 have been designated as torque input and torque output shafts, respectively, for purposes of illustration, it should be understood that the clutch will operate equally well with shaft 12 being the torque input shaft and the shaft 11 being the torque output shaft. The shaft 11 is provided with a carrier which includes spaced, outwardly extending, radial flanges 13 and 14 and a central section 15 which extends axially between the flanges 13 and 14 at the outer edges thereof. The flange 13 and central portion 15 of the carrier are formed as an integral part of the torque input shaft 11, while the flange 14 is held in position against an abutting shoulder 16 on the central portion 15 by a nut member 17. The flanges 13 and 14 and the central portion 15 form a clutch housing, with one end thereof being removable to facilitate assembly of the clutch within the housing.

The output shaft 12 extends into the housing formed by the carrier and is journaled in the end flange 14 by a bushing or bearing member 18. At its inner end, the torque output shaft 12 drivingly carries a first cam member 19 through a spline connection 20. The cam member 19 along with a second cam member 21 form a hub on the torque output shaft 12. The cam members 19 and 21 are provided with a plurality of circumferentially spaced matching recesses 22 and 23, respectively, which have inclined walls forming cam surfaces. A driving connection is established between the two cam members 19 and 21 by balls 24 which are pocketed within the recesses 22 and 23. The cam members 19 and 21 are normally prevented from separating axially by bearings 25 which act between the flange 14 and the cam member 19 and bearings 26 which act between the cam member 21 and a piston 27.

A plurality of stacked friction plates 28 extend between the central section 15 of the carrier and the cam member 21, and are alternately connected to the central section 15 and the cam member 21 for rotation therewith and for axial movement with respect thereto in a well known manner. The piston 27 is axially shiftable and abuttable against the friction plates 28 to exert a clamp-up pressure on the friction plates 28 so that when the piston 27 is moved to the right as viewed in FIG. 1, the torque from the input shaft 11 will be transferred through the carrier, friction plates 28, cam member 21, balls 24, and cam member 19 to the output shaft 12.

For the purpose of shifting the piston 27, a pressure chamber 29 is formed by the flange 13, central section 15 and the piston 27. Fluid pressure can be supplied to the pressure chamber 29 by fluid passageways 30 and 31 provided in the torque input shaft 11.

In order for the clutch 10 to operate with very little torque fluctuation, it is necessary to provide a source of constant fluid pressure for the pressure chamber 29. A suitable source of constant pressure is disclosed in FIG. 1 and includes a pump 32 which is preferably of the constant pressure variable displacement type, and a modulating valve indicated generally at 33. Fluid pressure from the pump 32 is directed through a fluid line 34 to the modulating valve 33 which dictates and maintains a constant fluid pressure which is supplied to the pressure chamber 29 by way of an additional fluid line 35, a slip ring 36, and the fluid passageways 30 and 31. The modulating valve 33 is of conventional structure, and includes a valve member 37 which is shiftable between supply, exhaust and neutral positions, and is responsive both to an external force and to the fluid pressure supplied to the chamber 29. The external force applied to the valve member 37 is controlled by a manual control lever 38 which acts on the valve member 37 through a compression spring 39. The fluid pressure supplied to the chamber 29 is also directed to a chamber 40 and exerts a force on the valve member 37 in opposition to the force exerted by the spring 39. Therefore, by manipulation of the manual control lever 38, the modulating valve 33 will supply and maintain any desired constant pressure to the chamber 29 between no pressure and the maximum pump pressure.

The operation of the above-described torque limiting clutch is as follows. When it is desired to transmit torque from the torque input shaft 11 to the torque output shaft 12, the manual control lever 38 is manipulated to cause the spring 39 to exert a force on the valve member 37 to thereby shift the valve member 37 to the right as viewed in FIG. 1. With the valve member 37 shifted to the right, fluid pressure from the pump 32 is free to flow through the modulating valve 33 to the fluid pressure chamber 29. Fluid pressure in the chamber 29 exerts a force on the piston 27 which is counteracted by the clutch plates 28 and the cam members 19 and 21. Since the fluid pressure supplied to the chamber 29 is also supplied to the chamber 40, the valve member 37 will be shifted back to its neutral position by the fluid pressure acting against the right end of the valve member 37 as soon as the fluid pressure in the chamber 29 has reached a predetermined desired pressure. The modulating valve 33 will also maintain the pressure within the chamber 29 constant since any pressure fluctuations within the chamber 29 will also be present in the chamber 40 and will shift the valve member 37 to either its supply or exhaust position. For example, if the pressure within the chamber 29 rises above the desired pressure, the pressure within chamber 40 will also rise and force the valve 37 to the left and establish communication between the fluid line 35 and the sump 41 to exhaust fluid from the chamber 29.

With the piston 27 exerting a force against the friction plates 28, the plates 28 are compressed and the torque from the input shaft 11 will be transmitted through the plates 28, the cam member 21, the balls 24, and the cam member 19 to the output shaft 12. The transmitted torque tends to cause relative rotation between the cam members 19 and 21, but due to the balls 24 pocketed within the recesses 22 and 23, any relative rotation between the cam members 19 and 21 must be accompanied by an axial separation between the cam members 19 and 21 as illustrated in FIG. 2. However, separation between the cam members 19 and 21 is resisted by the fluid pressure within chamber 29 and acting on the piston 27. Therefore, during operation there are three distinct forces which act on the piston 27 and are as follows: first, the fluid pressure within the chamber 29 exerts a constant force on the left-hand side of the piston 27; second, the separating force between the cam members 19 and 21 exerts a force on the right-hand side of the piston 27 which is directly proportional to the transmitted torque; and third, the clutch plate compressive force exerts a force on the right-hand side of the piston 27 which is the difference between the first and second forces and is therefore inversely proportional to the transmitted torque.

When the transmitted torque is equal to the rated torque which is determined by the setting of the modulating valve 33, the separating action between the cam members 19 and 21 will counteract a sufficient amount of the pressure exerted on the piston 27 by the fluid pressure in chamber 29 so that the clamp-up force is reduced and the friction plates 28 begin to slip. With the friction plates 28 thus slipping, the transmitted torque can no longer increase. However, if the transmitted torque begins to decrease, the separating action between the cam members 19 and 21 will also decrease so that a larger portion of the force exerted by the fluid pressure in chamber 29 on the piston 27 will be absorbed by the friction plates 28.

It can thus be seen that as the friction characteristics of the clutch plates vary, the clamp-up pressure on the clutch plate varies. For example, if the coefficient of friction of the clutch plates increases, the torque transmitted through the clutch can also increase. However, as the torque transmitted through the clutch increases, the separating force between cam members 19 and 21 will increase and reduce the clamp-up force available at the friction plates.

Since there will always be some pressure generated in chamber 29 due to the centrifugal effect on the fluid within chamber 29, it is necessary to provide means for holding the piston 27 away from the friction plates during periods of disengagement in order to minimize clutch drag. To this end, a plurality of Belleville springs 42 are provided and act between the piston 27 and a snap ring 43 on the shaft 11. Since the Belleville springs 42 exert a substantially constant force on the piston 27 they will not affect the operation of the clutch, but will merely require that a slightly greater constant force be exerted against the piston 27 by the fluid pressure within chamber 29 so that the force exerted by the Belleville springs will, in effect, be cancelled.

What is claimed is:

1. A selectively engageable and disengageable torque limiting clutch having torque input and torque output members mounted for rotation about a common axis, a plurality of adjacent friction plates alternately connected to said input and output members for rotation therewith, means abuttable with said plates for exerting a clamp-up force thereon, means for selectively applying and removing any desired constant clamp-up force on said first mentioned means, and means responsive to the transmitted torque to exert a force directly proportional to the transmitted torque on said first mentioned means to oppose the clamp-up force applied to said first mentioned means whereby the clamp-up force applied to said plates will be instantaneously varied in inverse proportion to the transmited torque.

2. The clutch as set forth in claim 1 wherein said means abuttable with said plates includes an axially shiftable piston mounted on one of said members, said piston and said one of said members forming a fluid chamber, and said means for selectively applying and removing any desired constant clamp-up force includes means for selectively supplying and exhausting any desired constant fluid pressure to and from said chamber, whereby any desired force is selectively applied to, and removed from said piston.

3. The clutch as set forth in claim 2 wherein said means responsive to the transmitted torque exerts a force on said piston in opposition to the force exerted by said fluid pressure.

4. A hydraulically operated friction clutch having rotatable input and output members, a carrier mounted on one of said members, hub means in driving engagement with the other of said members, a plurality of friction plates alternately connected to said carrier and said hub means, an axially shiftable piston mounted on said carrier and abuttable with said plates to exert a clamp-up pressure on said plates, said piston and carrier forming an expansible fluid chamber, means for supplying fluid to said chamber at any desired constant pressure to normally urge said piston against said plates, said hub means including first and second sections with a torque sensing means between said sections, one of said sections being axially shiftable and abuttable with said piston, said torque sensing means being responsive to the transmitted torque to move said one section axially against said piston with a force proportional to the transmitted torque, whereby the clamp-up pressure exerted on said plates by said piston is instantaneously varied inversely proportional to the transmitted torque.

5. The clutch as set forth in claim 4 wherein said torque sensing means includes opposed cam surfaces on opposing faces on said sections, whereby said one section will be shifted axially upon relative rotation between said sections.

6. The clutch as set forth in claim 4 wherein said torque sensing means includes a plurality of recesses having inclined walls provided on axially opposed faces of said first and second sections, and a spherical means positioned in each matched set of recesses, whereby said spherical means will transmit torque between said sections and will urge said one section axially upon relative rotation between said sections.

7. The clutch as set forth in claim 6 wherein said means for supplying fluid includes a source of fluid pressure, fluid passage means interconnecting said source and said chamber, and an adjustable modulating valve interposed in said fluid passage means between said source and said chamber.

8. A hydraulically operated selectively engageable and disengageable torque limiting clutch comprising: input and output members rotatable about a common axis; a carrier mounted on one of said members for rotation therewith; said carrier including a radially extending flange and a central housing section extending axially from the outer edge of said flange; a hub means mounted on the other of said members and positioned coaxially within said central housing section in radially spaced relation thereto; a plurality of friction plates extending radially between said central housing section and said hub means and being alternately connected to said central housing section and said hub means for rotation therewith and axial movement with respect thereto; a piston mounted within said carrier and abuttable with said plates and hub means; said piston and carrier forming an expansible fluid chamber; means for supplying fluid to said chamber at any desired constant pressure to selectively exert any desired clamp-up pressure on said plates to engage said clutch and to remove the clamp-up pressure on said plates to disengage said clutch; said hub means including first and second cam members, one of said cam members being mounted on said other of said input and output members and the other of said cam members being axially shiftable and abuttable with said piston; torque sensing means between said cam members and being responsive to the transmitted torque to axially shift said other of said cam members to exert a force on said piston which is proportional to the transmitted torque, whereby the clamp-up pressure exerted on said plates is instantaneously varied inversely proportional to the transmitted torque.

9. The clutch as set forth in claim 8 wherein said torque sensing means includes camming surfaces on axially opposed faces of said first and second cam members which provide a separating force between said first and second cam members upon relative rotation therebetween.

10. The clutch as set forth in claim 8 wherein said means for supplying fluid to said chamber at any desired constant pressure includes a source of fluid pressure, fluid line means interconnecting said fluid chamber and said source, and an adjustable modulating valve interposed in said fluid line means between said source and chamber and operable to maintain a selected constant pressure in said chamber by supplying fluid to an exhausting fluid from said chamber in response to pressure drops and pressure rises, respectively, in said chamber.

11. The clutch as set forth in claim 8 wherein said torque sensing means includes a plurality of circumferentially spaced matched recesses having inclined walls provided in axially opposed faces of said first and second cam members, and spherical means pocketed in each set of matched recesses whereby upon relative rotation between said first and second cam members said spherical means will move up the inclined walls of said recesses and axially separate said cam members.

References Cited
UNITED STATES PATENTS

| | | |
|---|---|---|
| 1,632,539 | 6/1927 | Chilton. |
| 2,587,712 | 3/1952 | Dodge _____ 192—56 XR |
| 2,642,971 | 6/1953 | Hagenbook. |
| 3,360,087 | 12/1967 | Hilpert. |

MARK NEWMAN, Primary Examiner

A. D. HERRMANN, Assistant Examiner

U.S. Cl. X.R.

64—29, 30; 192—85